Dec. 20, 1932.   F. B. THOMAS   1,891,658
LOCKING MEANS FOR ROTATABLE ELEMENTS
Filed Nov. 15, 1930
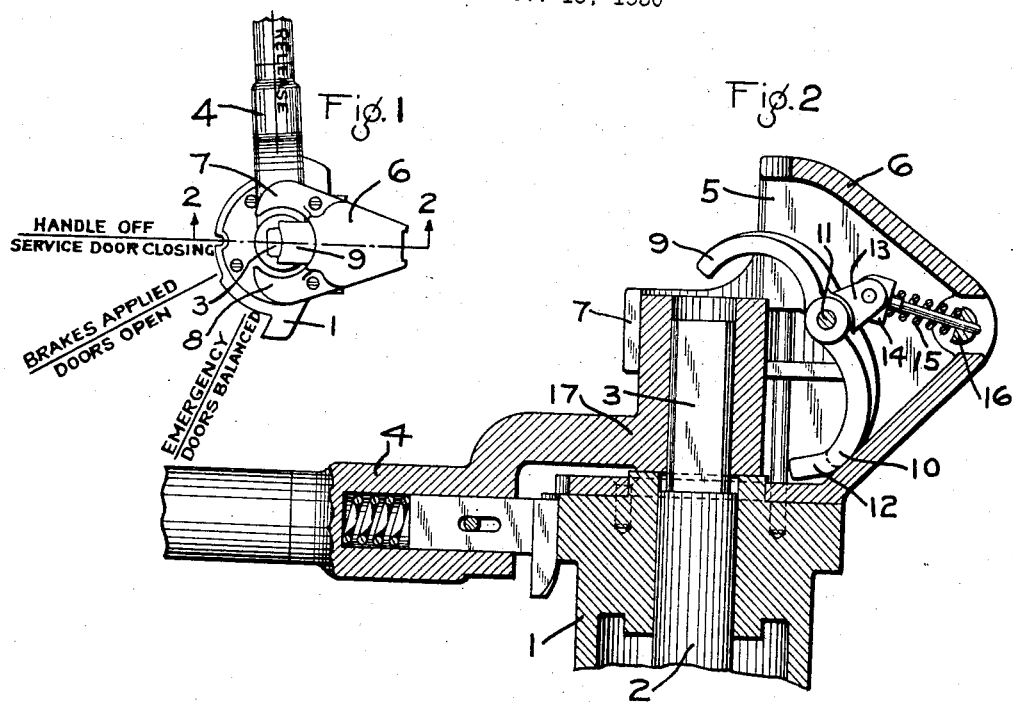
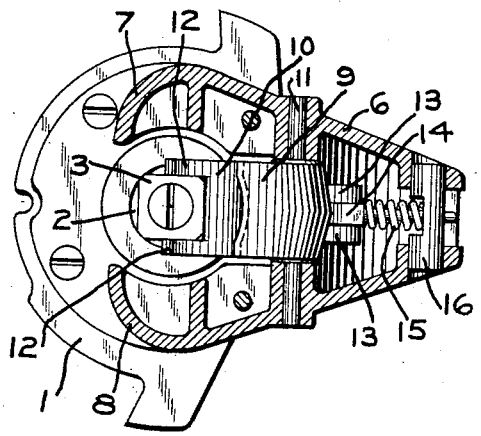
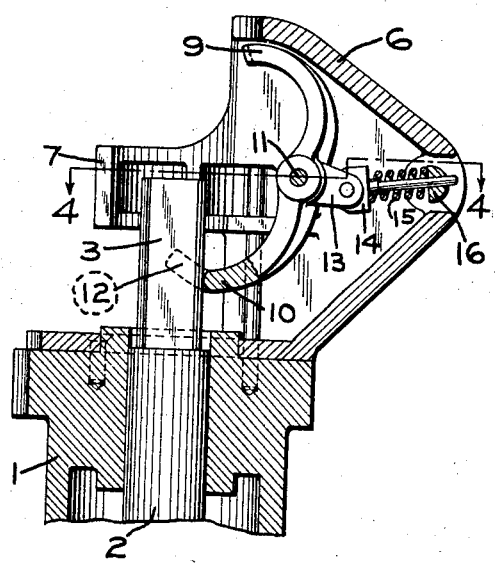
INVENTOR.
FRANK B. THOMAS
BY Wm. N. Cady
ATTORNEY.

Patented Dec. 20, 1932

1,891,658

UNITED STATES PATENT OFFICE

FRANK B. THOMAS, OF FOREST HILLS BOROUGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

LOCKING MEANS FOR ROTATABLE ELEMENTS

Application filed November 15, 1930. Serial No. 495,936.

This invention relates to control devices and more particularly to that type in which there is employed a rotatable shaft or stem upon which a controlling element or handle is adapted to be removably mounted.

The principal object of my invention is to provide a control device of the above type with means operative upon the removal of the controlling element from the shaft or stem to lock the shaft or stem against rotation and operative upon the application of the controlling element to unlock the shaft or stem.

Other objects and advantages will appear in the following more detailed description of my invention.

In the accompanying drawing; Fig. 1 is a plan view of a combined fluid pressure brake and door controlling valve device embodying my invention, the control handle being shown applied to the valve actuating stem; Fig. 2 is an enlarged sectional view taken on the line 2—2 of Fig. 1, the control handle being shown in handle off position and the locking element being shown in side elevation; Fig. 3 is a sectional view similar to Fig. 2 with the exception that the control handle is removed and the locking member is in locking engagement with the valve stem; and Fig. 4 is a horizontal sectional view through the valve device at a point indicated by the line 4—4 of Fig. 3, the locking member being shown in plan.

In the drawing, I have illustrated my invention as being embodied in a combined fluid pressure brake and door controlling valve device, but I do not wish to be limited to this specific embodiment, for I contemplate its use in other devices where it is desirable to lock a rotatable shaft or the like against rotation upon the removal of a controlling element from the shaft and where it is also desirable to unlock the shaft upon the application of the controlling element to the shaft.

The combined fluid pressure brake and door controlling valve device shown in the drawing may comprise a stationary casing 1, having the usual valve actuating stem 2 rotatably mounted therein. The outer end portion 3 of the stem 2 projects beyond the casing and is preferably square in cross section and is adapted to be operatively engaged by a controlling handle 4 having a stem receiving opening corresponding to the shape of the end portion 3 of the stem.

Rigidly secured to the upper end of the casing 1 is a guard member 5 having a hooded portion 6, and projecting outwardly from this portion are guard lugs 7 and 8 having their adjacent ends spaced apart a sufficient distance to permit the controlling handle 4, when the stem 2 is in handle off position, to be removed from or applied to the stem as the case may be. When the handle is applied to the stem 2 and is in any position other than handle off position, the guard lugs prevent the removal of the handle from the stem.

Contained in the hooded portion 6 of the guard member 5 is a lock member which is pivotally connected, intermediate its upper and lower ends 9 and 10, respectively, to the member 5 by a pin 11 having its ends mounted in the hooded portion. The ends 9 and 10 of the locking member are each directed toward the stem 2 and the lower end 10 is notched to provide spaced lugs 12 which are adapted to engage oppositely disposed flat surfaces of the end portion 3 of the stem and when in such engagement to lock the stem against rotation.

The locking member is also provided with rearwardly extending spaced arms 13 which are located intermediate the upper and lower ends of the member. The outer ends of these arms 13 are pivotally connected with one end of a plunger 14 which is subject at all times to the pressure of a spring 15, the other end of the plunger being slidably mounted in a member 16 pivotally mounted in the hooded portion 6 of the guard member.

Assuming now that the controlling handle 4 is in its operative position on the stem 2, as shown in Fig. 1 or 2, the pressure of the spring pressed plunger 14 is directed upwardly upon the arm 13 of the lock member, so that the upper end 9 of the lock member overlies the stem engaging portion of the handle and the lower end is out of engagement with the stem 2 and stem engaging portion of the handle. The upper end 9 of the lock member is maintained out of contact with the stem engaging portion of the handle by the lower end 10 of the lock member engaging the hooded portion 6 of the guard member as shown in Fig. 2.

When it is desired to remove the controlling handle 4 from the stem 2, the handle, and consequently the stem, is moved to handle off position as shown in Fig. 2 and is then lifted from the square portion 3 of the stem, the handle passing freely between the guard lugs 7 and 8. As the handle 4 is thus lifted, the upper end of the stem engaging portion thereof engages the upper overlying end 9 of the lock member and due to such engagement, the continued upward movement of the handle will cause the lock member to be rotated in a clockwise direction about the pin 11, moving the arm 13 and connected end of the plunger 14 downwardly. During this movement, the plunger 14 is also moved inwardly against the pressure of the spring 15, the rear end of the plunger adjusting the position of the pivotally mounted member 16, so that the plunger is free to slide relative to the member without the danger of any binding action occurring between these parts.

When the arm 13 and the connected end of the plunger have been moved downwardly to a position in which the axis of the connection between these members is slightly below the axis of the pin 11, the pressure of the spring pressed plunger on the arm 13 will be directed downwardly, causing the lock member to rotate with a snap action and without assistance by the handle 4 into locking engagement with the portion 3 of the stem 2, the handle having been raised a sufficient distance that it will not interfere with the lock member engaging the stem. Further, when the lock member has been actuated by the handle, to the position from which it is snapped into locking engagement with the stem, the stem engaging portion of the handle will still be in engagement with the outer end of the portion 3 of the stem and a portion 17 of the handle will be between the faces of the guard lugs 7 and 8. There is just sufficient clearance between the sides of the portion 17 of the handle and the faces of the lugs 7 and 8 to permit the free removal of the handle, so that rotary movement of the stem 2 and the handle 4 will be prevented by the handle engaging these faces.

When the lock member is actuated into locking engagement with the stem, the upper end 9 of the member is outside of the vertical plane of any portion of the handle, so that it will not interfere with the final raising of the handle from the stem.

It will here be noted that the stem 2 is effectively locked against rotary movement before the handle can be removed from the stem.

In applying the handle to the stem 2, the stem engaging portion of the handle is slipped over the portion 3 of the stem and moved downwardly relative to the portion 3, the lower end of the stem engaging portion of the handle engaging the ends of the locking lugs 12 of the lock member. With the lugs 12 thus engaged, further downward movement of the handle causes the lock member to rotate in an anti-clockwise direction about the pin 11. Now when the lock member has been moved by the handle to a position in which the axis of the connection between the arm 13 of the lock member and the plunger 14 has been moved slightly above the axis of the pin 11, the pressure of the spring-pressed plunger will be directed upwardly and will cause the lock member to operate with a snap action to unlocking position, as shown in Fig. 1, in which position, the lower end 10 of the member will be out of engagement with the stem and handle and the upper end 9 will again be within the vertical plane of the stem engaging portion of the handle.

From the foregoing description it will be seen that I have provided means whereby a rotatable element is locked against rotation upon the removal of a controlling member or handle therefrom and whereby the element is unlocked upon the application of the controlling member or handle.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a rotatable element, of a member removably mounted on said element through the medium of which the rotation of said element is controlled, and rockable means operated by said member, upon the removal of the member from said element, to lock said element against rotation.

2. The combination with a rotatable element, of a member removably mounted on said element through the medium of which the rotation of said element is controlled, and rockable means operated by said member, upon the removal of the member from said element, to lock said element against rotation and operated by said member, upon the application of said member to the element, to unlock said element.

3. The combination with a rotatable element, of a member removably mounted on said element through the medium of which the rotation of said element is controlled, and rockable means operated by said member, upon the removal of the member from said element, to lock said element against rotation, said means being in locking position in advance of the disengagement of the element by said member.

4. The combination with a rotatable element, of a member removably mounted on said element through the medium of which the rotation of said element is controlled, means movable into locking engagement with said element, to maintain said element against rotation, said means being initially moved toward locking position by said member when said member is being removed from said element, and means operative to finally move the locking means into locking position with respect to said element.

5. The combination with a rotatable element, of a member removably mounted on said element through the medium of which the rotation of said element is controlled, means movable into locking engagement with said element to maintain said element against rotation, said means being initially moved toward locking position by said member as the member is being removed from said element, and means for finally moving the locking means into locking engagement with said element.

6. The combination with a rotatable element, of a member removably mounted on said element through the medium of which the rotation of said element is controlled, means movable into locking engagement with said element to maintain said element against rotation, said means being initially moved toward locking position by said member as the member is being removed from said element, and resilient means for finally moving the locking means into locking engagement with said element.

7. The combination with a rotatable element, of a handle removably mounted on said element through the medium of which the rotation of said element is controlled, and a member movable into engagement with said element to lock the element against rotation and movable out of locking engagement with said element, said member having a portion overlapping said handle and out of engagement therewith adapted to be engaged by the handle when the handle is being removed for effecting the operation of said member to lock said element and having a lock portion adapted to be engaged by said handle when the handle is being applied for effecting the operation of said member to release said element.

8. The combination with a rotable element, of a handle removably mounted on said element through the medium of which the rotation of said element is controlled, and a pivotally mounted member movable into engagement with said element to lock the element against rotation and movable out of locking engagement with said element, said member having a portion overlapping said handle and out of engagement therewith adapted to be engaged by the handle when the handle is being removed for effecting the operation of said member to lock said element and having a lock portion adapted to be engaged by said handle when the handle is being applied for effecting the operation of said member to release said element.

9. The combination with a rotatable element, of a handle removably mounted on said element through the medium of which the rotation of said element is controlled, a member for locking said element against rotation, said member having a lock portion which is maintained out of locking relation with said element when said handle is in its operative position on said element and having another portion overlapping the outer end portion of the handle adapted to be engaged by said outer end portion of the handle when the handle is being removed for initially actuating said member toward locking position, and means for finally actuating said member into locking engagement with said element.

10. The combination with a rotatable element, of a handle removably mounted on said element through the medium of which the rotation of said element is controlled, a member locking said element against rotation, said member having a lock portion which is maintained out of locking relation with said element and out of engagement with the handle when the handle is in its operative position on said element and having another portion overlapping a portion of the handle adapted to be engaged by said handle when the handle is being removed for initially actuating said member toward locking position, and means for finally actuating said member into locking engagement with said element and for yieldably maintaining the member in locking engagement with said element.

11. In a controlling mechanism, the combination with a casing, of a shaft rotatably mounted in said casing, a control handle removably mounted on said shaft, guard members carried by said casing for preventing the removal of said handle in certain positions and having their adjacent ends spaced apart defining an opening for permitting the removal of the handle in another position, and a member for locking said shaft against rotation, said member being movable into locking engagement with said shaft when the handle is being removed from the shaft and before the handle is moved from between the adjacent ends of the guard members.

12. In a controlling mechanism, the combination with a casing, of a shaft rotatably mounted in said casing, a control handle removably mounted on said shaft, guard members carried by said casing for preventing the removal of said handle in certain positions and having their adjacent ends spaced apart defining an opening for permitting the removal of the handle in another position, and a member for locking said shaft against rotation, said member being movable into locking engagement with said shaft when the handle is being removed from the shaft and before the handle is out of operative engagement with the shaft.

13. In a controlling mechanism, the combination with a casing, of a shaft rotatably mounted in said casing, a control handle removably mounted on said shaft, guard members carried by said casing for preventing the removal of said handle in certain positions and having their adjacent ends spaced apart defining an opening for permitting the removal of the handle in another position, and a member for locking said shaft against rotation, said member being movable into locking engagement with said shaft when the handle is being removed from the shaft and before the handle is out of operative engagement with the shaft and being movable out of locking engagement with said shaft when the handle is being applied to the shaft.

14. In a controlling mechanism, the combination with a casing, of a shaft rotatably mounted in said casing, a control handle removably mounted on said shaft, guard members carried by said casing for preventing the removal of said handle in certain positions and having their adjacent ends spaced apart defining an opening for permitting the removal of the handle in another position, and a member for locking said shaft against rotation, said member being movable into locking engagement with said shaft when the handle is being removed from the shaft and before the handle is out of operative engagement with the shaft and being movable out of locking engagement with said shaft after the handle is in engagement with the shaft in applying the handle to the shaft.

15. In a controlling mechanism, the combination with a casing, of a shaft rotatably mounted in said casing, a control handle removably mounted on said shaft, guard members carried by said casing for preventing the removal of said handle in certain positions and having their adjacent ends spaced apart defining an opening for permitting the removal of the handle in another position, and a member for locking said shaft against rotation, said member being movable into locking engagement with said shaft when the handle is being removed from the shaft and before the handle is out of operative engagement with the shaft and being movable out of locking engagement with said shaft after the handle is in engagement with the shaft and is between the adjacent ends of said guard members in applying the handle to the shaft.

16. In a controlling mechanism, the combination with a casing, of a shaft rotatably mounted in said casing, a control handle removably mounted on said shaft, a member pivotally carried by said casing and being movable into engagement with said shaft upon the removal of the handle to lock the shaft against rotation and being movable out of locking engagement with the shaft upon the application of the handle to the shaft, said member being initially moved toward shaft locking or shaft releasing position by said handle, an arm on said member, and means operatively connected to said arm for finally moving said member into or out of locking engagement with the shaft and for yieldably maintaining the member in either of said positions.

17. In a controlling mechanism, the combination with a casing, of a shaft rotatably mounted in said casing, a control handle removably mounted on said shaft, a member pivotally carried by said casing and being movable into engagement with said shaft upon the removal of the handle to lock the shaft against rotation and being movable out of locking engagement with the shaft upon the application of the handle to the shaft, said member being initially moved toward shaft locking or shaft releasing position by said handle, an arm on said member, and means operatively connected to said arm and casing for finally moving said member to one or the other of said positions.

18. In a controlling mechanism, the combination with a casing, of a shaft rotatably mounted in said casing, a control handle removably mounted on said shaft, a member pivotally carried by said casing and being movable into engagement with said shaft upon the removal of the handle to lock the shaft against rotation and being movable out of locking engagement with the shaft upon the application of the handle to the shaft, said member being initially moved toward shaft locking or shaft releasing position by said handle, an arm on said member, and means pivotally connected to said arm and casing for finally moving said member to one or the other of said positions.

In testimony whereof I have hereunto set my hand, this 13th day of November, 1930.

FRANK B. THOMAS.